US012148569B2

(12) United States Patent
Oh et al.

(10) Patent No.: US 12,148,569 B2
(45) Date of Patent: Nov. 19, 2024

(54) MULTILAYER ELECTRONIC COMPONENT

(71) Applicant: SAMSUNG ELECTRO-MECHANICS CO., LTD., Suwon-si (KR)

(72) Inventors: Won Kuen Oh, Suwon-si (KR); Gyu Ho Yeon, Suwon-si (KR); Seo Won Jung, Suwon-si (KR); Seo Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 262 days.

(21) Appl. No.: 17/722,587

(22) Filed: Apr. 18, 2022

(65) Prior Publication Data

US 2023/0215629 A1 Jul. 6, 2023

(30) Foreign Application Priority Data

Dec. 30, 2021 (KR) .......................... 10-2021-0193197

(51) Int. Cl.
*H01G 4/008* (2006.01)
*H01G 4/012* (2006.01)
*H01G 4/12* (2006.01)
*H01G 4/30* (2006.01)

(52) U.S. Cl.
CPC ............. *H01G 4/008* (2013.01); *H01G 4/012* (2013.01); *H01G 4/1227* (2013.01); *H01G 4/30* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

| 2001/0043454 | A1 | 11/2001 | Yoshii et al. | |
| 2006/0145401 | A1* | 7/2006 | Mihara | H01G 4/232 |
| | | | | 264/618 |
| 2007/0057237 | A1* | 3/2007 | Ohtani | C03C 8/18 |
| | | | | 252/500 |

(Continued)

FOREIGN PATENT DOCUMENTS

| JP | H11-111564 A | 4/1999 |
| JP | 2001-307947 A | 11/2001 |
| JP | 2002-217054 A | 8/2002 |

*Primary Examiner* — Michael P McFadden
(74) *Attorney, Agent, or Firm* — MORGAN, LEWIS & BOCKIUS LLP

(57) ABSTRACT

A multilayer electronic component includes a body including a dielectric layer and first and second internal electrodes alternately disposed with the dielectric layer interposed therebetween, a first external electrode disposed on the body and connected to the first internal electrode, and a second external electrode disposed on the body and connected to the second internal electrode, wherein the first and second external electrodes include a first electrode layer disposed on the body and including one or more of copper (Cu), nickel (Ni), and alloys thereof and a second electrode layer disposed on the first electrode layer, including silver (Ag) and further including one or more of palladium (Pd), platinum (Pt), and gold (Au), wherein the first electrode layer does not include glass and an average thickness of the first electrode layer is 1 μm or more and 10 μm or less.

17 Claims, 5 Drawing Sheets

(56) References Cited

U.S. PATENT DOCUMENTS

| | | | |
|---|---|---|---|
| 2011/0141657 A1* | 6/2011 | Jeon | H01G 4/2325 |
| | | | 361/321.1 |
| 2013/0258546 A1* | 10/2013 | Kim | H01G 4/30 |
| | | | 156/89.18 |
| 2016/0086735 A1* | 3/2016 | Yoon | B32B 18/00 |
| | | | 501/137 |
| 2017/0330689 A1* | 11/2017 | Hatanaka | H01G 2/065 |
| 2021/0366654 A1* | 11/2021 | Iguchi | H01G 4/1218 |
| 2022/0122776 A1* | 4/2022 | Iguchi | H01G 4/30 |

* cited by examiner

MULTILAYER ELECTRONIC COMPONENT

CROSS-REFERENCE TO RELATED APPLICATION

This application claims benefit of priority to Korean Patent Application No. 10-2021-0193197 filed on Dec. 30, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), which is one of the multilayer electronic components, is an important chip component used in industries such as communications, computers, home appliances, and automobiles due to advantages of having a small size and guaranteeing high capacitance, and in particular, is a key passive element used in various electric, electronic and information communication devices such as mobile phones, computers, and digital TVs.

Conventionally, in order to mount multilayer ceramic capacitors on a substrate, external electrodes of the multilayer ceramic capacitors include a plating layer formed on an electrode layer. However, due to a high-temperature environment, the substrate may be bent and tin (Sn) included in the plating layer is oxidized during mounting, which causes solder cracks or increases contact resistance.

To solve this problem, an external electrode structure including a first electrode layer containing copper (Cu) and a second electrode layer formed of an electrode containing silver (Ag) and palladium (Pd) has been used. In the case of using such external electrodes, a multilayer ceramic capacitor may be mounted on a substrate using a silver epoxy as a conductive glue instead of tin soldering.

In such an external electrode structure, the first electrode layer is formed by firing a paste including glass and conductive metal powder at a temperature of 700 to 800° C., so that the multilayer ceramic capacitor completed after firing may have non-uniform stress distribution. Accordingly, cracks may occur in the multilayer ceramic capacitor and adhesion strength may be lowered even after the multilayer ceramic capacitor is mounted on a substrate.

SUMMARY

An aspect of the present disclosure is to solve a problem in which a multilayer electronic component has non-uniform stress distribution due to thermal expansion and contraction occurring when a first electrode layer is formed, thereby suppressing an occurrence of cracks in the multilayer electronic component.

An aspect of the present disclosure is also to solve a problem in which adhesion strength is lowered after a multilayer electronic component is mounted on a substrate, when non-uniform stress distribution occurs in the multilayer electronic component.

According to an aspect of the present disclosure, a multilayer electronic component may include: a body including a dielectric layer and first and second internal electrodes alternately disposed with the dielectric layer interposed therebetween; a first external electrode disposed on the body and connected to the first internal electrode; and a second external electrode disposed on the body and connected to the second internal electrode, wherein the first and second external electrodes include a first electrode layer disposed on the body and including one or more of copper (Cu), nickel (Ni), and alloys thereof and a second electrode layer disposed on the first electrode layer, including silver (Ag) and further including one or more of palladium (Pd), platinum (Pt), and gold (Au), and the first electrode layer is free of glass while an average thickness of the first electrode layer is 1 μm or more and 10 μm or less.

According to an aspect of the present disclosure, a multilayer electronic component may include: a body including a dielectric layer and first and second internal electrodes alternately disposed with the dielectric layer interposed therebetween; a first external electrode disposed on the body and connected to the first internal electrode; and a second external electrode disposed on the body and connected to the second internal electrode, wherein the first and second external electrodes include a first electrode layer disposed on the body and includes one or more of copper (Cu), nickel (Ni), and alloys thereof and is free of glass, and a second electrode layer disposed on the first electrode layer and including silver (Ag) and copper (Cu).

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
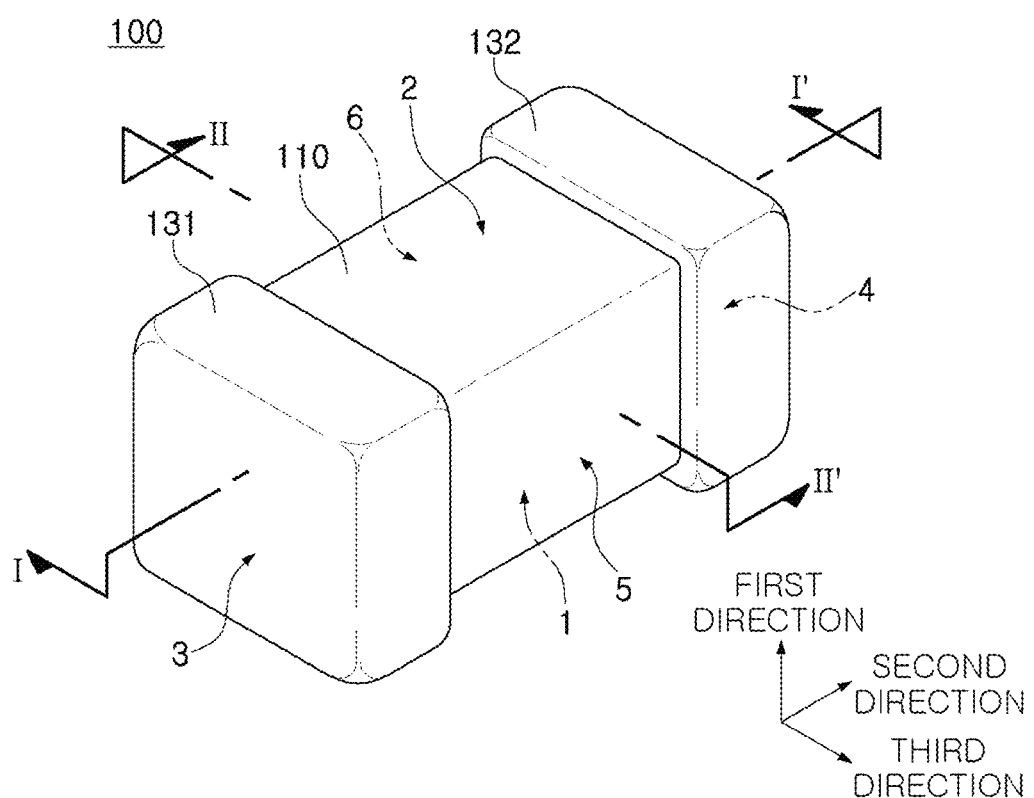
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a stacking direction or thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
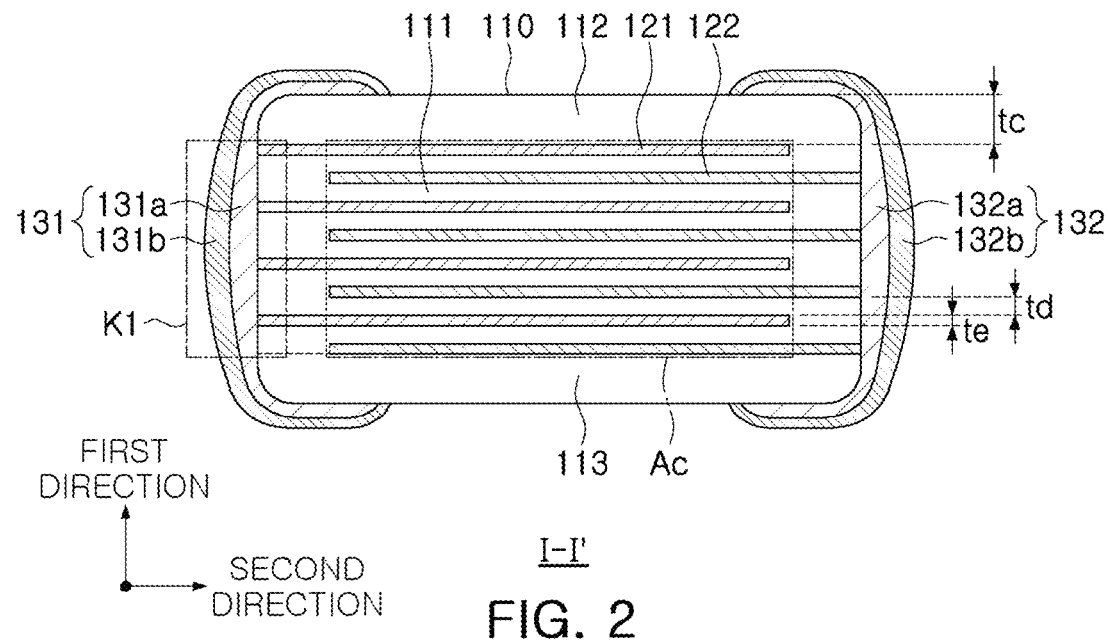
FIG. 2 is a cross-sectional view taken along line I-I' of FIG. 1.

FIG. 2 is a cross-sectional view taken along line I-I' of FIG. 1.

Figure 3:
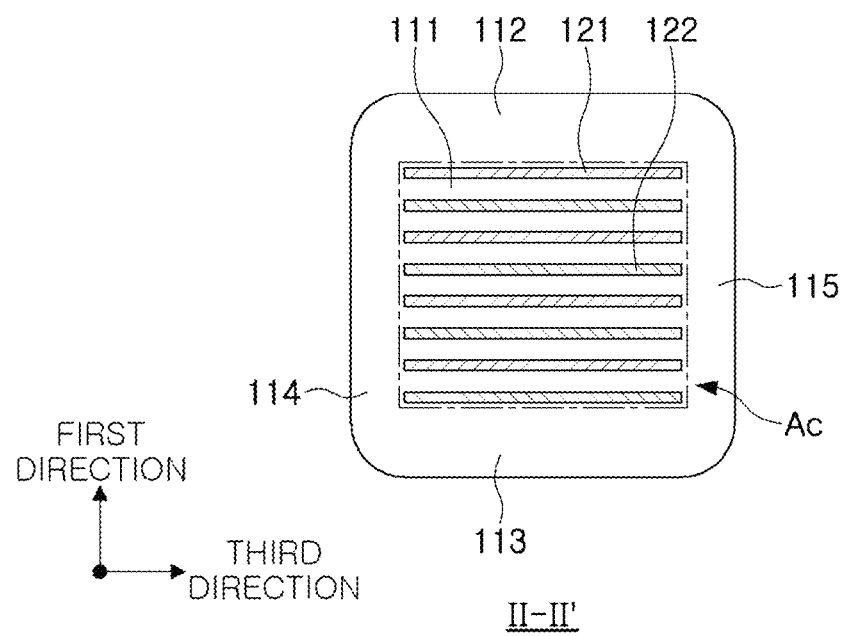
FIG. 3 is a cross-sectional view taken along line II-II' of FIG. 1.

FIG. 3 is a cross-sectional view taken along line II-II' of FIG. 1.

Figure 4:
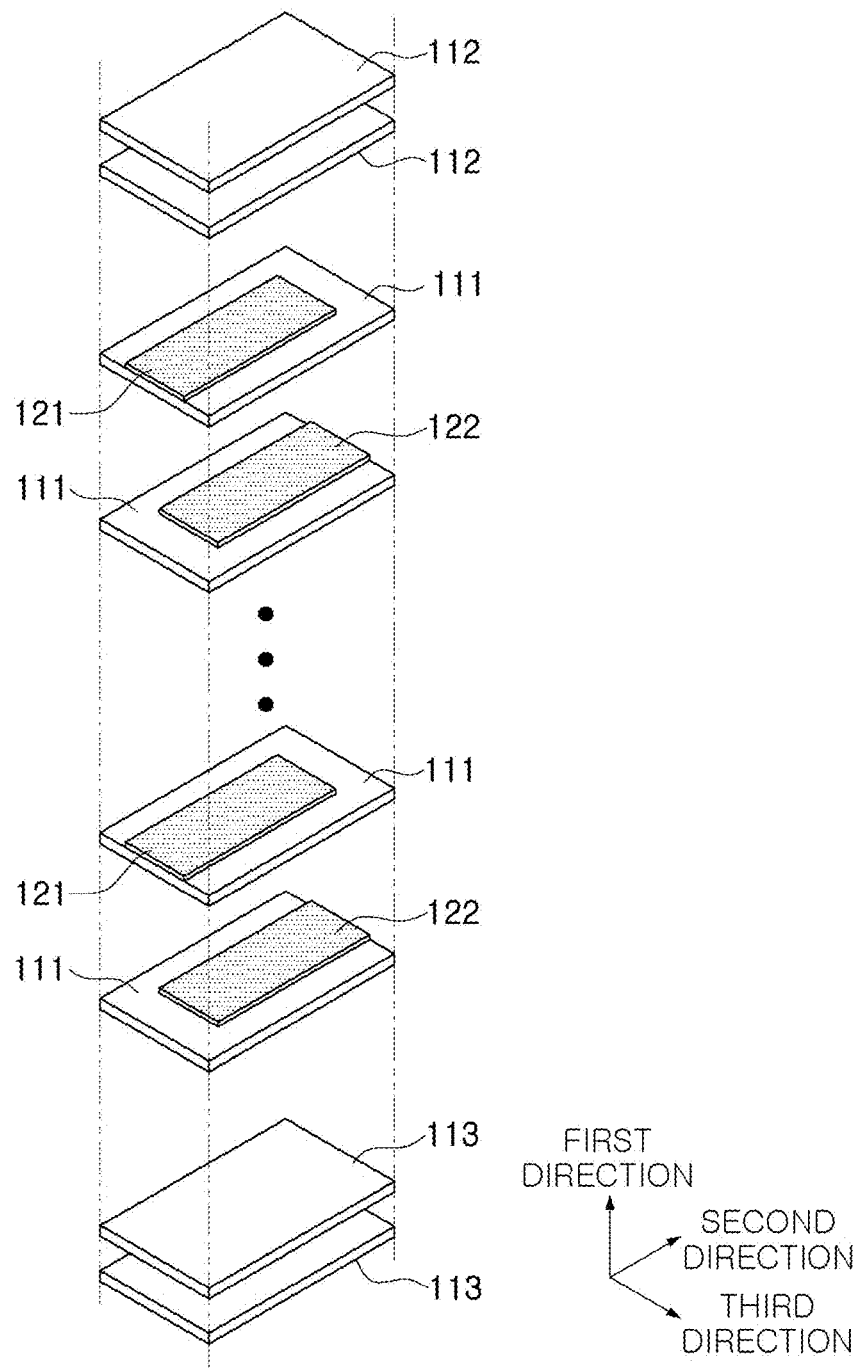
FIG. 4 is an exploded perspective view illustrating a body of a multilayer electronic component according to an exemplary embodiment in the present disclosure.

FIG. 4 is an exploded perspective view illustrating a body of a multilayer electronic component according to an exemplary embodiment in the present disclosure.

Hereinafter, a multilayer electronic component 100 according to an exemplary embodiment in the present disclosure will be described with reference to FIGS. 1 to 4.

A multilayer electronic component may include: a body 110 including a dielectric layer 111 and first and second internal electrodes 121 and 122 alternately disposed with the dielectric layer 111 interposed therebetween; a first external electrode 131 disposed on the body and connected to the first internal electrode; and a second external electrode 132 disposed on the body and connected to the second internal electrode, wherein the first and second external electrodes include first electrode layers 131a and 132a disposed on the body and including one or more of copper (Cu), nickel (Ni), and alloys thereof and second electrode layers 131b and 132b disposed on the first electrode layer, including silver (Ag) and further including one or more of palladium (Pd), platinum (Pt), and gold (Au), wherein the first electrode layer does not include glass (e.g., the first electrode layer is free of glass) and an average thickness of the first electrode layer is 1 µm or more and 10 µm or less.

In the body 110, a dielectric layer 111 and internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca or Zr is partially dissolved in $BaTiO_3$ or $BaTiO_3$.

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, an average thickness td of the dielectric layer 111 is not particularly limited. For example, an average thickness td of the dielectric layer 111 may be 0.2 µm or more and 2 µm or less.

However, in general, when the dielectric layer is formed to be thin to have a thickness less than 0.6 µm, particularly, when the thickness of the dielectric layer is 0.35 µm or less, reliability may be lowered.

According to an exemplary embodiment in the present disclosure, since the average thickness of the first electrode layers 131a and 132a satisfies 1 µm or more and 10 µm or less, excellent reliability may be secured even when the average thickness of the dielectric layer 111 is 0.35 µm or less. Therefore, the effect of improving reliability according to the present disclosure may be more remarkable when the average thickness of the dielectric layer 111 is 0.35 µm or less.

The average thickness td of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The body 110 may include a capacitance forming portion Ac disposed inside the body 110 and forming capacitance by including the first internal electrode and the second internal electrode 122 disposed to face each other with the dielectric layer 111 interposed therebetween and cover portions 112 and 113 formed on upper and lower surfaces of the capacitance forming portion Ac in the first direction.

In addition, the capacitance forming portion Ac is a portion contributing to capacitance formation of the capacitor, and may be formed by repeatedly stacking the plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 may not be particularly limited. However, the average thickness of the cover portions 112 and 113 may be 15 µm or less in order to more easily achieve miniaturization and high capacitance in the multilayer electronic component. In addition, according to an exemplary embodiment in the present disclosure, since the average thickness of the first electrode layers 131a and 132a satisfies 1 µm or more and 10 µm or less, the reliability of the multilayer electronic component may be improved even when the average thickness tc of the cover portion is 15 µm or less. The average thickness of the cover portions 112 and 113 may refer to a size in the first direction and may be a value obtained by averaging sizes of the cover portions 112 and 113 in the first direction measured at five points at equal intervals above or below the capacitance forming portion Ac.

In addition, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margin portions 114 and 115 do not need to be particularly limited. However, the average width of the margin portions 114 and 115 may be 15 μm or less in order to more easily achieve miniaturization and high capacitance of the multilayer electronic component. In addition, according to an exemplary embodiment in the present disclosure, since the average thickness of the first electrode layers 131a and 132a satisfies 1 μm or more and 10 μm or less, excellent reliability may be secured even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 measured at five points at equal intervals in the third direction on a side surface of the capacitance forming portion Ac.

The plurality of internal electrodes 121 and 122 may be alternately stacked with the dielectric layer 111.

The internal electrodes 121 and 122 may include first and second internal electrodes 121 and 122. The first and second internal electrodes 121 and 122 are alternately disposed to face each other with the dielectric layer 111 constituting the body 110 interposed therebetween and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 is not connected to the second external electrode 132 but is connected to the first external electrode 131, and the second internal electrode 122 is not connected to the first external electrode 131 but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently firing the green sheets.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste for internal electrodes, a screen printing method or a gravure printing method may be used but the present disclosure is not limited thereto.

In an exemplary embodiment, the internal electrodes 121 and 122 may include Ni. In this case, an alloy may be formed with one or more of copper (Cu), nickel (Ni), and an alloy included in the first electrode layers 131a and 132a of the present disclosure, which will be described later, or electrical connectivity may be improved through metal bonding.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

In the present exemplary embodiment, a structure in which the multilayer electronic component 100 has two external electrodes 131 and 132 is described, but the number or shape of the external electrodes 131 and 132 may be modified according to shapes of the internal electrodes 121 and 122 or other purposes.

In addition, the average thickness te of the internal electrodes 121 and 122 is not particularly limited. For example, the average thickness te of the internal electrodes 121 and 122 may be 0.2 μm or more and 2 μm or less.

However, in general, when the internal electrode is formed to be thinner to have a thickness less than 0.6 μm, in particular, when the thickness of the internal electrode is 0.35 μm or less, reliability may be deteriorated.

According to an exemplary embodiment in the present disclosure, since the average thickness of the first electrode layers 131a and 132a satisfies 1 μm or more and 10 μm or less, excellent reliability may be secured even when the average thickness of the internal electrodes 121 and 122 is 0.35 μm or less.

Therefore, the effect according to the present disclosure may be more remarkable and miniaturization and high capacitance of the multilayer electronic component may be more easily achieved when the internal electrodes 121 and 122 have an average thickness of 0.35 µm or less.

The average thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, thicknesses of one internal electrode in a scanned image may be measured from 30 points at equal intervals in the length direction, and an average value thereof may be measured. The 30 points at equal intervals may be designated in the capacitance forming portion Ac. In addition, if the average value is measured by extending the measurement of the average value to 10 internal electrodes, the average thickness of the internal electrodes may be further generalized.

The external electrodes 131 and 132 may include first electrode layers 131a and 132a disposed on the body 110 and including one or more of copper (Cu), nickel (Ni), and alloys thereof and second electrode layers 131b and 132b disposed the first electrode layers 131a and 132a, including silver (Ag), and further including one or more of palladium (Pd), platinum (Pt), and gold (Au), and an average thickness of the first electrode layers 131a and 132a may be greater than or equal to 1 µm and less than or equal to 10 µm.

The first electrode layers 131a and 132a may include at least one of copper (Cu), nickel (Ni), and alloys thereof, thereby securing electrical connectivity with the internal electrode. That is, the first electrode layers 131a and 132a may be in contact with and electrically connected to the first and second internal electrodes 121 and 122 alternately exposed through one surface of the body 110 in the second direction, thereby securing electrical conduction between the first and second external electrodes 131 and 132 and the first and second internal electrodes 121 and 122.

In particular, when the first and second internal electrodes include Ni, an alloy may be formed through inter-diffusion with copper (Cu) of the first electrode layer to improve electrical connectivity. Accordingly, the nickel (Ni) and copper (Cu)-nickel (Ni) alloy included in the first electrode layer may be formed by diffusion from the internal electrodes.

According to an exemplary embodiment in the present disclosure, the first electrode layers 131a and 132a may not include glass.

In a related art, there has been an attempt to form the first electrode layer by firing a paste including glass and conductive metal powder.

In this case, since firing is performed at a high temperature of about 700 to 800° C., excessive stress may occur in the body 110.

In particular, since stress is concentrated on a surface in which the first electrode layer is in contact with the body 110, there may be a large difference in the stress between the surface in which the first electrode layer and the body 110 are in contact with each other and a surface in which the first electrode layer and the body are not in contact with each other. When the stress is non-uniformly concentrated on the body 110 in this manner, the multilayer electronic component 100 may be subjected to bending stress, and cracks may occur.

Therefore, according to an exemplary embodiment in the present disclosure, the first electrode layers 131a and 132a are formed at a low temperature without including glass, thereby suppressing a phenomenon in which stress is concentrated on a specific portion of the body 110 to suppress an occurrence of cracks in the multilayer electronic component 100.

There may be various methods for forming the first electrode layers 131a and 132a at a low temperature without using glass.

For example, the first electrode layer may be formed through a plating method, a sputtering method, etc., copper (Cu) particles of 100 nm or less may be dispersed in a solvent, applied to the surface of the body, and then fired at a temperature of 300° C. or less.

In this case, the copper (Cu) particles of 100 nm or less may be sintered without glass even at a temperature of 300° C. or less. Accordingly, since the first electrode layers 131a and 132a of the external electrode may be formed at a relatively low temperature, less stress due to thermal expansion due to heating and cooling may be transmitted to the body 110.

Meanwhile, when the first electrode layers 131a and 132a are formed by firing copper (Cu) particles of 100 nm or less, the copper (Cu) particles included in the first electrode layers 131a and 132a after firing may be aggregated with each other to form an agglomerate, and an average diameter of the copper (Cu) agglomerate may satisfy 200 nm or less. Accordingly, in an exemplary embodiment, the first electrode layers 131a and 132a include copper (Cu) agglomerate, and an average diameter of the copper (Cu) agglomerate may be 200 nm or less.

An average diameter of the copper (Cu) agglomerate may be a value obtained by polishing a multilayer electronic component to a central position in the width direction (the third direction) to expose a cross-section (L-T cross-section in the length direction and thickness direction, capturing an image of a region disposed at the center, among five equally divided regions of the first and second electrode layers in the thickness direction with a scanning electron microscope (SEM), and then averaging a maximum Feret diameter measured through an ImageJ program. Meanwhile, the Feret diameter may refer to a distance between tangential pairs of metal particles, and the maximum Feret diameter may refer to a value obtained by measuring a maximum distance between tangential pairs of metal particles. However, the present disclosure is not limited thereto, and a minimum Feret diameter may also be used.

Therefore, according to an exemplary embodiment, since the first electrode layers 131a and 132a do not include glass, the content of one or more of copper (Cu), nickel (Ni), and alloys thereof may be 0.95 or more compared to the total mole number of elements included in the first electrode layers. That is, except for impurities, the first electrode layers 131a and 132a may be substantially formed of one or more of copper (Cu), nickel (Ni), and alloys thereof. For example, the content of one or more of copper (Cu), nickel (Ni), and alloys thereof may be determined from an image observed using scanning electron microscope-energy dispersive X-ray spectroscopy (SEM-EDS).

Figure 5:
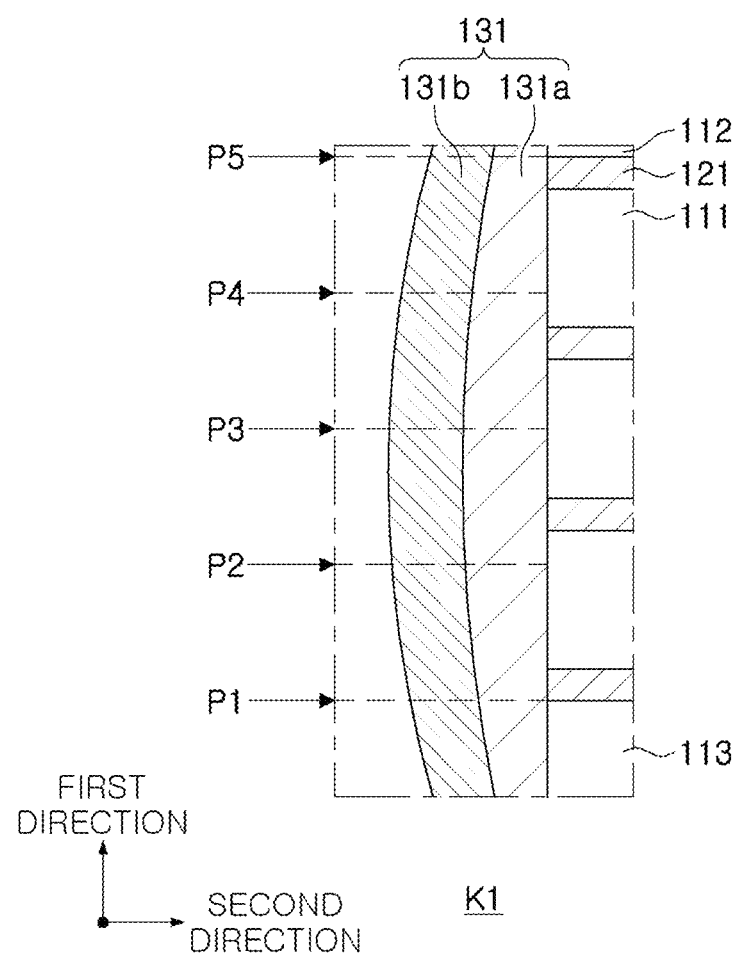
FIG. 5 is an enlarged view of region K1 of FIG. 2.

FIG. 5 is an enlarged view of a region K1 of FIG. 2.

Referring to FIG. 5, in an exemplary embodiment, the average thickness of the first electrode layers 131a and 132a may be 1 µm or more and 10 µm or less. If the average thickness of the first electrode layers 131a and 132a is less than 1 µm, connectivity with the internal electrode cannot be ensured, so that the multilayer electronic component 100 may not have sufficient capacitance.

Meanwhile, if the average thickness of the first electrode layer exceeds 10 µm, non-uniformity of the stress applied to the body 110 may increase when the first electrode layer is formed, thereby causing cracks in the multilayer electronic component.

Therefore, in the multilayer electronic component according to an exemplary embodiment in the present disclosure, by controlling the average thickness of the first electrode layer to be 1 µm or more and 10 µm or less, sufficient capacitance per unit volume may be obtained, and by reducing non-uniformity of stress applied to the body 110, an occurrence of cracks in the multilayer electronic component may be suppressed, and adhesion strength may be improved when the multilayer electronic component is mounted on a substrate.

The average thickness of the first electrode layers 131a and 132a may be measured by observing a cross-section cut in the first and second directions at the center in the third direction and may be a value obtained by averaging sizes of the first electrode layers 131a and 132a measured at five points at equal intervals disposed on the third surface or the fourth surface in the thickness direction. Specifically, the average thickness may be an average value of the sizes of the first electrode layers 131a and 132a at five points P1, P2, P3, P4, and P5 in the first direction at equal intervals in the thickness direction from the internal electrode disposed at the lowermost portion to the internal electrode 121 disposed at the uppermost portion in the cross-section (L-T cross-section) cut in the length direction (the second direction) and thickness direction (the first direction) at the center of the body in the width direction (the third direction).

Figure 6:
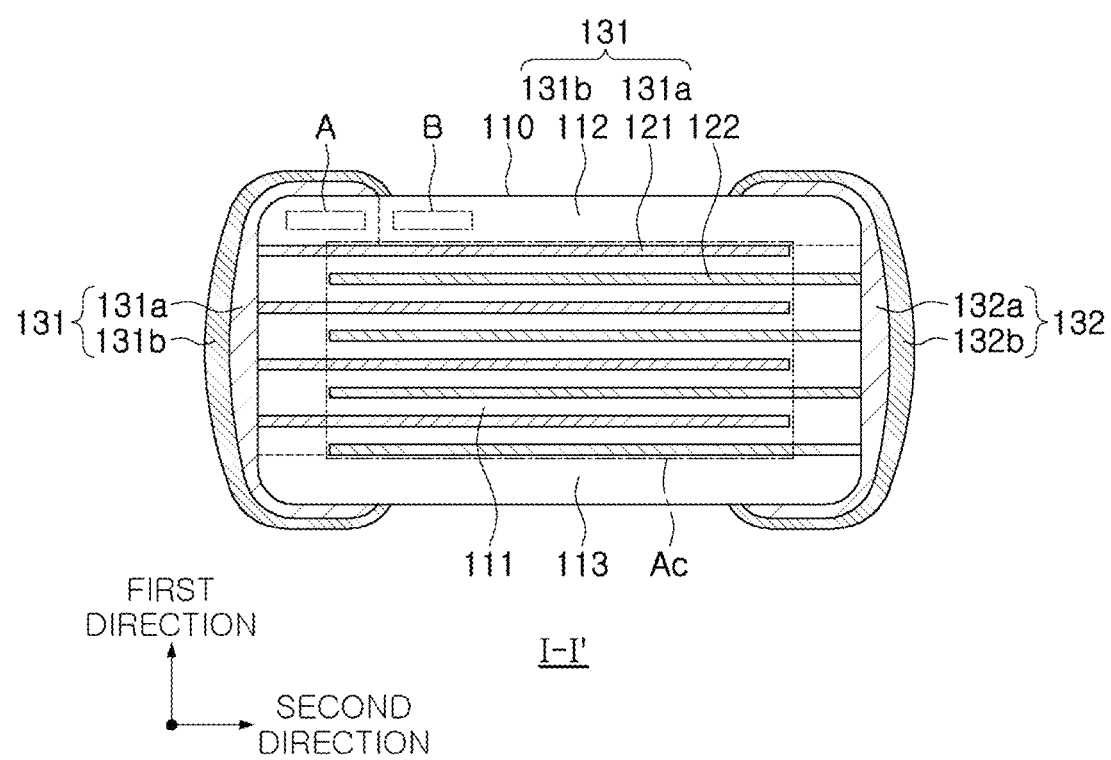
FIG. 6 is a cross-sectional view of a multilayer electronic component according to an exemplary embodiment in the present disclosure corresponding to FIG. 2.

FIG. 6 is a cross-sectional view of a multilayer electronic component according to an exemplary embodiment in the present disclosure corresponding to FIG. 2.

Referring to FIG. 6, in an exemplary embodiment, the body 110 may include the capacitance forming portion Ac forming capacitance by including the first and second internal electrodes 121 and 122 disposed with the dielectric layer 111 interposed therebetween and cover portions 112 and 113 disposed on upper and lower surfaces of the capacitance forming portion in the first direction, and when a value of an average residual stress measured in a region A covered with the first electrode layer is Sa and a value of an average residual stress measured in a region B not covered with the first electrode layer is Sb, a value of {(Sa−Sb)/Sb}×100 is 0.20 or less.

Accordingly, the imbalance of residual stresses of the cover portions 112 and 113 of the body 110 may be minimized, thereby suppressing the occurrence of cracks in the multilayer electronic component.

In this case, the region A covered with the first electrode layer may refer to a central region of the cover portion covered with the first electrode layer in the cross-section in the length-thickness direction (L-T cross-section) cut in the central portion in the width direction, and the region B not covered with the second electrode layer may refer to a region adjacent to the region A covered with the first electrode layer, among regions of the cover portion not covered with the first electrode layer. In addition, Sa and Sb may be average values measured through Raman shift analysis at five arbitrary points in each of regions A and B.

The second electrode layers 131b and 132b may be disposed on the first electrode layer and may include silver (Ag) and, in addition, palladium (Pd).

The second electrode layer may serve to prevent oxidation and prevent penetration of moisture and hydrogen. In addition, since the second electrode layer includes silver (Ag), mounting may be performed on the substrate by a conductive adhesive including silver (Ag) and resin without a solder including tin (Sn).

Accordingly, a problem of solder cracks occurring due to stress due to a difference in thermal expansion coefficient between the external electrodes and the solder in a high temperature-low temperature cycle.

Meanwhile, when the second electrode layer includes only silver (Ag) or the content of silver (Ag) is increased, ion migration may occur.

Accordingly, the second electrode layers 131b and 132b may further contain palladium (Pd) to suppress the occurrence of ion migration, and palladium (Pd) may be replaced or mixed with another metal capable of preventing ion migration, such as platinum (Pt) or gold (Au), etc.

In an exemplary embodiment, the second electrode layers 131b and 132b may further include glass. Glass may control a sintering rate of silver (Ag) and palladium (Pd) metals when forming the second electrode layers 131b and 132b by applying and firing a paste, and secure adhesion to the substrate.

The glass component may have a composition in which oxides are mixed, and may be one or more selected from the group consisting of silicon oxide, boron oxide, aluminum oxide, transition metal oxide, alkali metal oxide, and alkaline earth metal oxide but is not particularly limited. The transition metal may be one or more selected from the group consisting of zinc (Zn), titanium (Ti), vanadium (V), manganese (Mn), iron (Fe), and nickel (Ni), the alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

In an exemplary embodiment, the second electrode layers 131b and 132b may further include copper (Cu). Accordingly, an alloy may be formed with palladium (Pd) included in the second electrode layer to improve a bonding strength between the first electrode layers 131a and 132a and the second electrode layers 131b and 132b.

Copper (Cu) included in the second electrode layer may be formed as copper is included in a conductive paste when forming the second electrode layer, or may be formed as copper (Cu) included in the first electrode layer is diffused to the second electrode layers 131b and 132b during a process of applying a conductive paste including silver (Ag) and palladium (Pd) to the first electrode layers 131a and 132a including copper (Cu) and then performing firing.

In an exemplary embodiment, the second electrode layers 131b and 132b may include a copper (Cu)-palladium (Pd) alloy. The copper (Cu)-palladium (Pd) alloy may be formed by mutual diffusion and reaction between copper (Cu) included in the first electrode layer and palladium (Pd) included in the second electrode layer during the firing process, so that the first electrode layer may secure high adhesion to the second electrode layer, even without glass.

In this case, the content of the copper (Cu)-palladium (Pd) alloy may increase from an outer surface of the second electrode layer toward an interface between the second electrode layer and the first electrode layer. For example, the variation in content of the copper (Cu)-palladium (Pd) alloy may be observed from an image obtained using a scanning electron microscope-energy dispersive X-ray spectroscopy (SEM-EDS).

Palladium included in the second electrode layers 131b and 132b may be most distributed at an interface with the first electrode layers 131a and 132a as palladium is diffused toward the first electrode layers 131a and 132a, and accordingly, since copper (Cu)-palladium (Pd) intermetallic compounds are sufficiently formed at the interface, adhesion between the first electrode layer and the second electrode layer may be further strengthened.

Meanwhile, the components of the first electrode layers 131a and 132a and the second electrode layers 131b and 132b may be calculated from an image observed using a scanning electron microscope-energy dispersive X-ray spectroscopy (SEM-EDS). Specifically, the multilayer electronic component may be polished to a position of the center in the width direction (the third direction) to expose a cross-section in the length direction and thickness direction (L-T cross-section), the first and second electrode layers are equally divided into five regions in the thickness direction, and components, at %, and wt % of each element included in the first and second electrode layers in a region disposed at the center may be measured using an EDS.

A size of the multilayer electronic component 100 is not particularly limited.

However, in order to achieve miniaturization and high capacitance at the same time, it is necessary to increase the number of stacks by reducing the thickness of the dielectric layer and the internal electrodes, and therefore, the effect of improving reliability and breakdown voltage according to the present disclosure may be more remarkable in the multilayer electronic component 100 having a size of 0603 (length×width, 0.6 mm×0.3 mm) or less.

Accordingly, in consideration of manufacturing errors and a size of the external electrode, the effect of improving reliability according to the present disclosure may be more remarkable when the length of the multilayer electronic component 100 is 0.66 mm or less and the width is 0.33 mm or less. Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

Example

Table 1 below illustrates capacitance characteristics, stress change, crack occurrence, and adhesion strength after mounting measured and evaluated, while varying the average thickness of the first electrode layer not including glass.

As described above, the average thickness of the first electrode layer is an average value of the sizes of the first electrode layers 131a and 132a in the first direction measured at five points at equal intervals in the thickness direction disposed on the third or fourth surface.

In addition, by SEM-EDS analysis, it was confirmed that the first electrode layer included copper (Cu), nickel (Ni) and alloys thereof and did not include glass components such as Si, Ba, Zn, and Ca.

For the capacitance characteristics, when capacitance of a completed chip was measured under the conditions of 1 kHz and AC 1V, a case in which a sample is one or more having a capacitance distribution deviating from an average by 30% or more was determined as NG.

For the stress change, after a multilayer electronic component was polished to a central position in the width direction (the third direction) to expose the cross-section in the length direction and thickness direction (L-T cross-section), average residual stresses Sa and Sb were calculated by Raman shift analysis at five arbitrary points of the central region A of the cover portion covered with the first electrode layer and five arbitrary points of the region B of the cover portion adjacent to the central region A of the cover portion covered with the first electrode layer, among regions not covered with the first electrode layer, and a value of {(Sa−Sb)/Sb}×100 was calculated.

For crack occurrence, cross-sections of 100 multilayer electronic component samples in the width and thickness direction (W-T cross-sections) per test number were polished until the external electrode was peeled off, and then observed through a scanning electron microscope or an optical microscope to check the presence of cracks.

For adhesion strength after mounting, a temperature cycle of −55° C. to +125° C. (maintained at the Min./Max. temperature for 30 minutes each) for 100 multilayer electronic component samples mounted on the substrate for each Test No., and thereafter, a maximum force until deformation of 2 mm or more occurred was measured and averaged in a shear test.

TABLE 1

| Test No. | Average thickness of first electrode layer (μm) | Capacitance characteristics | Change in stress | Crack occurrence | Adhesion strength after mounting (N/mm$^2$) |
| --- | --- | --- | --- | --- | --- |
| 1 | 0.1 | NG (50/100) | 0.1% | 0% (0/100) | 24.5 |
| 2 | 0.5 | NG (30/100) | 0.1% | 0% (0/100) | 24.0 |
| 3 | 1 | OK | 0.13% | 0% (0/100) | 25.2 |
| 4 | 2 | OK | 0.14% | 0% (0/100) | 24.3 |
| 5 | 4 | OK | 0.15% | 0% (0/100) | 23.4 |
| 6 | 6 | OK | 0.18% | 0% (0/100) | 21.2 |
| 7 | 8 | OK | 0.20% | 0% (0/100) | 20.3 |
| 8 | 10 | OK | 0.20% | 0% (0/100) | 18.8 |
| 9 | 11 | OK | 0.23% | 10% (10/100) | 9.5 |
| 10 | 13 | OK | 0.25% | 30% (30/100) | 8.7 |
| 11 | 15 | OK | 0.25% | 40% (40/100) | 8.3 |

In Test Nos. 1 and 2, the average thickness of the first electrode layer was less than 1 μm, and it can be seen that the capacitance characteristics are not improved due to insufficient connectivity with the internal electrode.

Test Nos. 9 to 11 are cases in which the average thickness of the first electrode layer exceeded 10 μm, and it can be seen that, although the capacitance characteristics are excellent, the stress change value is large due to concentration of excessive stress applied to the body when the first electrode layer is formed, and crack occurrence is not suppressed. Accordingly, it can also be seen that the adhesion strength after mounting on the substrate was weakened.

Test Nos. 3 to 8 are cases in which the average thickness of the first electrode layer is 1 μm or more and 10 μm or less, and it can be seen that capacitance characteristics are excellent by securing connectivity with the internal electrode, and the occurrence of cracks is prevented by suppressing concentration of excessive stress applied to the body when forming the first electrode layer. Accordingly, it can be seen that the adhesion strength is excellent even after mounting on the substrate.

In an exemplary embodiment in the present disclosure, by adjusting the average thickness of the first electrode layers 131a and 132a to be 1 μm or more and 10 μm or less, the capacitance characteristics are excellent, the occurrence of cracks is prevented by suppressing the concentration of excessive stress applied to the body when the first electrode layer is formed, and accordingly, the multilayer electronic component 100 having excellent adhesion strength even after being mounted on the substrate may be provided.

One of the various effects of the present disclosure is that the external electrode has a first electrode layer and a second electrode layer, the first electrode layer includes at least one of Cu, Ni, and alloys thereof, connectivity with internal electrodes is improved by adjusting an average thickness of the first electrode layer, and an occurrence of cracks may be suppressed by reducing a change in stress of the multilayer electronic component.

One of the various effects of the present disclosure is to suppress an occurrence of cracks by reducing a stress change of the multilayer electronic component by forming the first electrode layer through nano-particles without glass to enable low-temperature firing.

One of the various effects of the present disclosure is to suppress an occurrence of cracks by reducing a stress change of the multilayer electronic component when the first electrode layer is formed of a plating layer not including glass.

One of the various effects of the present disclosure is to improve the reliability of the multilayer electronic component by adjusting a thickness of the first electrode layer.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed with the dielectric layer interposed therebetween;
   a first external electrode disposed on the body and connected to the first internal electrode; and
   a second external electrode disposed on the body and connected to the second internal electrode,
   wherein the first and second external electrodes include;
   a first electrode layer disposed on the body and including one or more of copper (Cu), nickel (Ni), and alloys thereof, and
   a second electrode layer disposed on the first electrode layer, including silver (Ag), a copper (Cu)-palladium (Pd) alloy and one or more of palladium (Pd), platinum (Pt), and gold (Au),
   wherein the first electrode layer is substantially free of glass, and
   a content of the copper (Cu)-palladium (Pd) alloy increases from an outer surface of the second electrode layer to an interface between the second electrode layer and the first electrode layer.

2. The multilayer electronic component of claim 1, wherein a content of one or more of copper (Cu), nickel (Ni), and alloys thereof included in the first electrode layer is 0.95 or more over a total mole number of elements included in the first electrode layer.

3. The multilayer electronic component of claim 1, wherein the first electrode layer includes a copper (Cu) agglomerate, and an average diameter of the copper (Cu) agglomerate is 200 nm or less.

4. The multilayer electronic component of claim 1, wherein the second electrode layer further includes glass.

5. The multilayer electronic component of claim 1, wherein the second electrode layer further includes copper (Cu).

6. The multilayer electronic component of claim 1, wherein the first and second internal electrodes include nickel (Ni).

7. The multilayer electronic component of claim 1, wherein
   the body includes a capacitance forming portion forming capacitance by including the first and second internal electrodes disposed with the dielectric layer interposed therebetween and cover portions disposed on upper and lower surfaces of the capacitance forming portion in a first direction, and
   when a value of an average residual stress measured in a region covered with the first electrode layer is Sa and a value of an average residual stress measured in a region not covered with the first electrode layer is Sb, a value of $\{(Sa-Sb)/Sb\}\times 100$ is 0.20 or less.

8. The multilayer electronic component of claim 1, wherein an average thickness of the first and second internal electrodes is 0.35 μm or less.

9. The multilayer electronic component of claim 1, wherein an average thickness of the dielectric layer is 0.35 μm or less.

10. The multilayer electronic component of claim 1, wherein
    the body includes a capacitance forming portion forming capacitance by including the first and second internal electrodes disposed with the dielectric layer interposed therebetween and cover portions disposed on upper and lower surfaces of the capacitance forming portion in a first direction, and
    an average thickness of the cover portion is 15 μm or less.

11. A multilayer electronic component comprising:
    a body including a dielectric layer and first and second internal electrodes alternately disposed with the dielectric layer interposed therebetween;
    a first external electrode disposed on the body and connected to the first internal electrode; and
    a second external electrode disposed on the body and connected to the second internal electrode,
    wherein the first and second external electrodes include a first electrode layer disposed on the body and includes one or more of copper (Cu), nickel (Ni), and alloys thereof, and
    a second electrode layer disposed on the first electrode layer and including a copper (Cu)-palladium (Pd) alloy, wherein a content of the copper (Cu)-palladium (Pd) alloy increases from an outer surface of the second electrode layer to an interface between the second electrode layer and the first electrode layer.

12. The multilayer electronic component of claim 11, wherein an average thickness of the first electrode layer is 1 μm or more and 10 μm or less.

13. The multilayer electronic component of claim 11, wherein an average thickness of the first electrode layer is 1 μm or more and 4 μm or less.

14. The multilayer electronic component of claim 11, wherein the first electrode layer includes a copper (Cu) agglomerate.

15. The multilayer electronic component of claim 14, wherein an average diameter of the copper (Cu) agglomerate is 200 nm or less.

16. The multilayer electronic component of claim 11, wherein the second electrode layer further includes glass.

17. The multilayer electronic component of claim 11, wherein the second electrode layer further includes one or more of palladium (Pd), platinum (Pt), and gold (Au).

* * * * *